United States Patent
Sato et al.

(10) Patent No.: US 9,290,711 B2
(45) Date of Patent: Mar. 22, 2016

(54) COAL DEACTIVATION APPARATUS

(75) Inventors: Keiichi Sato, Tokyo (JP); Keiji Tanizaki, Tokyo (JP); Setsuo Omoto, Tokyo (JP)

(73) Assignee: MITSUBISHI HEAVY INDUSTRIES, LTD., Tokyo (JP)

(*) Notice: Subject to any disclaimer, the term of this patent is extended or adjusted under 35 U.S.C. 154(b) by 476 days.

(21) Appl. No.: 13/881,619

(22) PCT Filed: Nov. 25, 2011

(86) PCT No.: PCT/JP2011/077123
§ 371 (c)(1),
(2), (4) Date: Apr. 25, 2013

(87) PCT Pub. No.: WO2012/081371
PCT Pub. Date: Jun. 21, 2012

(65) Prior Publication Data
US 2013/0239471 A1    Sep. 19, 2013

(30) Foreign Application Priority Data
Dec. 17, 2010    (JP) .................... 2010-281183

(51) Int. Cl.
*C10L 9/08* (2006.01)
*C10B 57/08* (2006.01)

(52) U.S. Cl.
CPC ............... *C10L 9/083* (2013.01); *C10B 57/08* (2013.01); *C10L 9/08* (2013.01); *C10L 2290/58* (2013.01); *C10L 2290/60* (2013.01)

(58) Field of Classification Search
CPC ....... C10L 9/083; C10L 9/08; C10L 2290/60; C10L 2290/58; C10B 57/08
See application file for complete search history.

(56) References Cited

U.S. PATENT DOCUMENTS

| | | | |
|---|---|---|---|
| 4,396,395 A | 8/1983 | Skinner et al. | |
| 4,645,513 A | 2/1987 | Kubota et al. | |

(Continued)

FOREIGN PATENT DOCUMENTS

| | | | |
|---|---|---|---|
| JP | 59-74189 A | 4/1984 | |
| JP | 63-6434 B2 | 2/1988 | |

(Continued)

OTHER PUBLICATIONS

Notification of Transmittal of Translation of the International Preliminary Report on Patentability (Form PCT/IB/326) of International Application No. PCT/JP2011/077123 mailed Jan. 31, 2012 with Forms PCT/IB/373, PCT/IB/338 and PCT/ISA/237. (7 pages).

(Continued)

*Primary Examiner* — Cephia D Toomer
(74) *Attorney, Agent, or Firm* — Westerman, Hattori, Daniels & Adrian, LLP (57) ABSTRACT

The coal deactivation apparatus including: a separating device that separates out a portion of the beneficiated coal deactivated in the main treatment apparatus; a main evaluation apparatus into which the sample of the beneficiated coal separated out by the separating apparatus is supplied; a blower and heater that supply air at the evaluation temperature to the main evaluation apparatus; a temperature sensor that detects the temperature of the air that has heat-treated the sample in the main evaluation apparatus; and a control unit that, when the temperature of the air is at or below the lower limit on the basis of information from the temperature sensor, determines whether or not the temperature of the process gas is at or below the lower limit and if the process gas temperature exceeds the lower limit, controls the heater to reduce the temperature of the process gas by a prescribed value.

5 Claims, 4 Drawing Sheets

(56) References Cited

U.S. PATENT DOCUMENTS

| | | |
|---|---|---|
| 6,436,158 B1 | 8/2002 | Fujikawa et al. |
| 2005/0241217 A1 | 11/2005 | Hogsett et al. |
| 2011/0236516 A1* | 9/2011 | Yoshiyama .............. C10B 53/04 425/110 |

FOREIGN PATENT DOCUMENTS

| | | |
|---|---|---|
| JP | 10-279969 A | 10/1998 |
| JP | 11-310785 A | 11/1999 |
| JP | 2000-297288 A | 10/2000 |
| JP | 2007-536392 A | 12/2007 |
| JP | 2011-37938 A | 2/2011 |
| WO | 2011/016371 A1 | 2/2011 |

OTHER PUBLICATIONS

Office Action dated Nov. 25, 2015, issued in counterpart German Application No. 11 2011 104 409.7 (6 pages).

* cited by examiner

COAL DEACTIVATION APPARATUS

TECHNICAL FIELD

The present invention relates to a coal inactivation system configured to inactivate coal by heating the coal with a treatment gas containing oxygen.

BACKGROUND ART

Low rank coals (low grade coals), coals having a high moisture content such as lignite and sub-bituminous coals, are abundant. However, the heating value per unit weight is small, and the transportation efficiency is low. Accordingly, such coal is heated and dried to increase the heating value per unit weight, and also compression-molded to improve the handling.

Meanwhile, the low grade coal thus heated is likely to adsorb water. In addition, a carboxyl group and the like are released from the surface, and radicals and the like are generated on the surface. This increases the surface activity, promoting a reaction with oxygen in air. As a result, spontaneous combustion may occur due to a reaction heat generated by the reaction.

For this reason, for example, the following inactivation treatment is carried out. Specifically, low grade coal is dried and pyrolyzed. After tar is separated from the pyrolyzed coal, the pyrolyzed coal is heated (approximately 150 to 170° C.) in a low oxygen atmosphere (oxygen concentration: approximately around 10%) to partially oxidize the surface of the pyrolyzed coal, thereby decreasing the surface activity of the pyrolyzed coal. By such an inactivation treatment, the coal is reformed to prevent spontaneous combustion of the coal (see, for example, the following Patent Literature 1, etc.).

CITATION LIST

Patent Literature

Patent Literature 1: Japanese Patent Application Publication No. Hei 11-310785

SUMMARY OF INVENTION

Technical Problem

Meanwhile, the composition of coal varies, depending on the mining site where the coal is extracted.

Accordingly, in the inactivation treatment as described above, various treatment conditions such as an oxygen concentration in an atmosphere, a temperature of the atmosphere, and a treatment period are set so that coals of any composition can be inactivated sufficiently. As a result, a coal which can be inactivated sufficiently under relatively wide treatment conditions is also inactivated under relatively strict treatment conditions; hence, the treatment cost is increased wastefully.

Accordingly, an object of the present invention is to provide a coal inactivation system capable of readily inactivating coals of various compositions under necessary and sufficient conditions.

Solution to Problem

In order to achieve the above-described object, a coal inactivation system according to a first invention is a coal inactivation system configured to inactivate coal by heating the coal with a treatment gas containing oxygen, characterized in that the coal inactivation system comprises: a treatment apparatus body, to inside of which the coal is supplied; treatment gas-supply means configured to supply the treatment gas to the inside of the treatment apparatus body; treatment gas-oxygen concentration-adjustment means configured to adjust an oxygen concentration $Oc$ in the treatment gas; treatment gas-temperature-adjustment means configured to adjust a temperature $Tc$ of the treatment gas; fractionation means configured to fractionate a portion of the coal inactivated in the treatment apparatus body; an evaluation apparatus body, to inside of which a sample of the coal fractionated by the fractionation means is supplied; test gas-supply means configured to supply a test gas having an evaluation temperature $Tt$ to the inside of the evaluation apparatus body; test gas-temperature-detection means configured to detect a temperature $Te$ of the test gas having heated the sample in the evaluation apparatus body; and control means configured to, based on information from the test gas-temperature-detection means, when the temperature $Te$ of the test gas is equal to or higher than a higher limit value $Teh$, judge whether or not the oxygen concentration $Oc$ of the treatment gas is equal to or higher than a higher limit value $Oh$, if the oxygen concentration $Oc$ of the treatment gas is lower than the higher limit value $Oh$, control the treatment gas-oxygen concentration-adjustment means in such a manner as to increase the oxygen concentration $Oc$ of the treatment gas by a given value $Ofu$, and if the oxygen concentration $Oc$ of the treatment gas is equal to or higher than the higher limit value $Oh$, further judge whether or not the temperature $Tc$ of the treatment gas is equal to or higher than a higher limit value $Th$, and control the treatment gas-temperature-adjustment means in such a manner as to increase the temperature $Tc$ of the treatment gas by a given value $Tfu$ if the temperature $Tc$ of the treatment gas is lower than the higher limit value $Th$, and when the temperature $Te$ of the test gas is equal to or lower than a lower limit value $Tel$, judge whether or not the temperature $Tc$ of the treatment gas is equal to or lower than a lower limit value $Tl$, if the temperature $Tc$ of the treatment gas is higher than the lower limit value $Tl$, control the treatment gas-temperature-adjustment means in such a manner as to decrease the temperature $Tc$ of the treatment gas by a given value $Tfd$, if the temperature $Tc$ of the treatment gas is equal to or lower than the lower limit value $Tl$, further judge whether or not the oxygen concentration $Oc$ of the treatment gas is equal to or lower than a lower limit value $Ol$, and control the treatment gas-oxygen concentration-adjustment means in such a manner as to decrease the oxygen concentration $Oc$ of the treatment gas by a given value $Ofd$ if the oxygen concentration $Oc$ of the treatment gas is higher than the lower limit value $Ol$.

A coal inactivation system according to a second invention is the coal inactivation system according to the first invention, characterized in that, when the temperature $Te$ of the test gas is equal to or lower than the lower limit value $Tel$, the control means controls the treatment gas-oxygen concentration-adjustment means and the treatment gas-temperature-adjustment means in such a manner as to set the oxygen concentration $Oc$ and the temperature $Tc$ of the treatment gas at the lower limit values $Ol$ and $Tl$, respectively, if the temperature $Tc$ of the treatment gas is equal to or lower than the lower limit value $Tl$ while the oxygen concentration $Oc$ of the treatment gas is equal to or lower than the lower limit value $Ol$.

A coal inactivation system according to a third invention is the coal inactivation system according to any one of the first and the second inventions, characterized in that, when the temperature $Te$ of the test gas is higher than the lower limit value $Tel$ but lower than the higher limit value $Teh$, the control means controls the treatment gas-oxygen concentration-adjustment means and the treatment gas-temperature-adjustment means in such a manner as to maintain the oxygen concentration Oc and the temperature Tc of the treatment gas as they are.

A coal inactivation system according to a fourth invention is the coal inactivation system according to any one of the first to the third inventions, characterized in that the coal inactivation system further comprises test gas-carbon dioxide concentration-detection means configured to detect a carbon dioxide concentration Ce of the test gas having heated the sample in the evaluation apparatus body, and when the temperature Te of the test gas is higher than the lower limit value Tel but lower than the higher limit value Teh, the control means, based on information from the test gas-carbon dioxide concentration-detection means, if the carbon dioxide concentration Ce in the test gas is equal to or higher than a higher limit value Ceh, judges again whether or not the oxygen concentration Oc of the treatment gas is equal to or higher than the higher limit value Oh, and if the carbon dioxide concentration Ce in the test gas is equal to or lower than a lower limit value Cel, judges again whether or not the temperature Tc of the treatment gas is equal to or lower than the lower limit value Tl.

A coal inactivation system according to a fifth invention is the coal inactivation system according to the fourth invention, characterized in that, when the temperature Te of the test gas is higher than the lower limit value Tel but lower than the higher limit value Teh, the control means controls the treatment gas-oxygen concentration-adjustment means and the treatment gas-temperature-adjustment means in such a manner as to maintain the oxygen concentration Oc and the temperature Tc of the treatment gas as they are if the carbon dioxide concentration Ce in the test gas is higher than the lower limit value Cel but lower than the higher limit value Ceh based on the information from the test gas-carbon dioxide concentration-detection means.

Advantageous Effects of Invention

Even when the composition of coal supplied to the treatment apparatus body varies from time to time, the coal inactivation system according to the present invention is capable of readily inactivating coals of such compositions under necessary and sufficient conditions.

DESCRIPTION OF EMBODIMENTS

Figure 1:
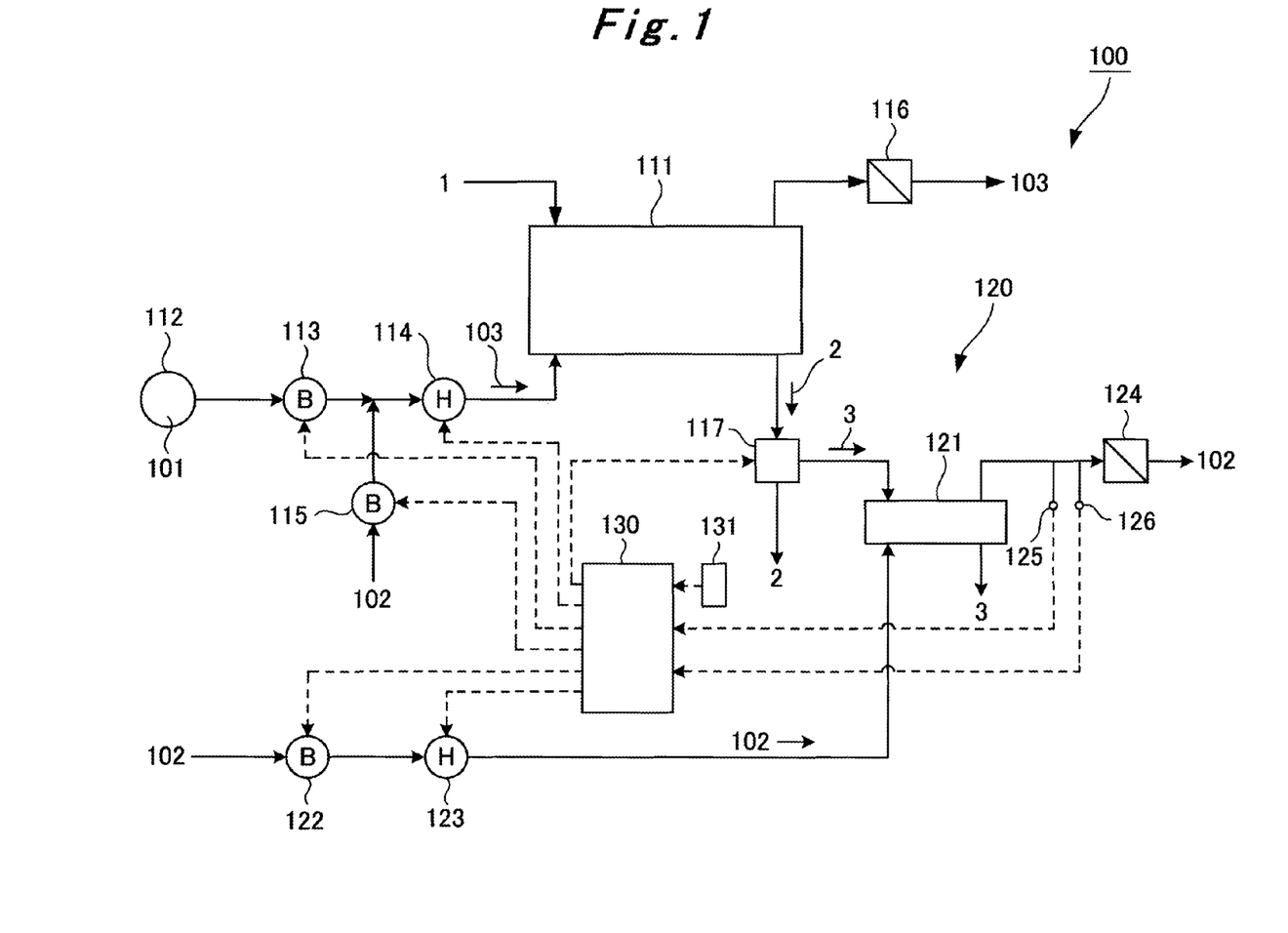
FIG. 1 is a schematic configuration diagram of a main embodiment of a coal inactivation system according to the present invention.

Embodiments of a coal inactivation system according to the present invention will be described based on the drawings. However, the present invention is not limited to the following embodiments explained based on the drawings.
<Main Embodiment>
A main embodiment of the coal inactivation system according to the present invention will be described based on FIGS. 1 to 4.
As shown in FIG. 1, a nitrogen gas supply source 112, which is an inert gas supply source, is connected to a lower portion of a treatment apparatus body 111 via a blower 113 and a heater 114. Pyrolyzed coal 1, coal obtained by drying and pyrolyzing low grade coal, is supplied to the inside of the treatment apparatus body 111 through an upper portion thereof. A blower 115 configured to supply air 102 is connected between the blower 113 and the heater 114.

In other words, operating the blowers 113 and 115 makes it possible to heat a treatment gas 103 with the heater 114 and supply the treatment gas 103 to the inside of the treatment apparatus body 111, the treatment gas 103 being a mixture of a nitrogen gas 101 from the nitrogen gas supply source 112 with the air 102 from the outside. Here, the oxygen gas concentration in the treatment gas 103 can be adjusted by adjusting amounts of the nitrogen gas 101 and the air 102 supplied from the blowers 113 and 115, while the temperature of the treatment gas 103 can be adjusted by adjusting the heater 114.

A filter 116 is connected to the upper portion of the treatment apparatus body 111. The filter 116 is configured to remove dust in the treatment gas 103 used in and discharged from the inside of the treatment apparatus body 111.

A fractionation device 117 is disposed to the lower portion of the treatment apparatus body 111. The fractionation device 117 is fractionation means configured to fractionate only a small portion of reformed coal 2 inactivated in and discharged from the treatment apparatus body 111. Most of the reformed coal 2 not fractionated by the fractionation device 117 is collected into an unillustrated vessel such as a container. A sample 3 of the small portion of the reformed coal 2 fractionated by the fractionation device 117 is supplied to the inside of an evaluation apparatus body 121 of an evaluation apparatus 120 through an upper portion thereof. The evaluation apparatus 120 is configured to evaluate the inactivation state of the sample 3.

A blower 122 configured to supply an air 102, a test gas, is connected to a lower portion of the evaluation apparatus body 121 via a heater 123. A filter 124 is connected to the upper portion of the evaluation apparatus body 121. The filter 124 is configured to remove dust in the air 102 used in and discharged from the inside of the evaluation apparatus body 121. The reformed coal 2 evaluated in the inside of the evaluation apparatus body 121 is discharged from the lower portion thereof.

Between the evaluation apparatus body 121 and the dust removal filter 124, a temperature sensor 125 and a $CO_2$ sensor 126 are provided. The temperature sensor 125 is test gas-temperature-detection means configured to detect a temperature of the air 102, and the $CO_2$ sensor 126 is test gas-carbon dioxide concentration-detection means configured to detect a carbon dioxide concentration in the air 102. Each of these sensors 125, 126 is electrically connected to an input section of a controller 130 that is control means. Further, a control board 131 that is input means is electrically connected to the input section of the controller 130. An output section of the controller 130 is electrically connected to each of the blowers 113, 115, 122, the heaters 114, 123, and the fractionation device 117. The controller 130 is capable of controlling the operation of each of the blower 122, the heater 123, and the fractionation device 117 based on information from the control board 131, and is also capable of controlling the operation of each of the blowers 113, 115 and the heater 114 based on information from the control board 131 and information from the sensors 125, 126 (the details will be described later).

Note that, as the treatment apparatus body 111, any of various types that have heretofore been utilized for inactivation treatment can be employed; examples thereof include those for batch processing, those for continuous processing such as sintering machine type (mesh conveyor type) and circular grate type described in Patent Literature 1 above, etc., and other similar types. Moreover, as the evaluation apparatus body 121 of the evaluation apparatus 120, any type can be employed, including those for batch processing, continuous processing such as sintering machine type (mesh conveyor type) and circular grate type having a similar structure to that of the treatment apparatus body 111 but smaller than the treatment apparatus body 111, and other types, as long as the supplied sample 3 can be exposed to an atmosphere at a predetermined temperature for a predetermined period. Further, as the fractionation device 117, any type can be employed such as a movable gate or a movable constant-volume cylinder, as long as it can fractionate a portion of the reformed coal 2 discharged from the treatment apparatus body 111.

In the present embodiment as described above, the nitrogen gas supply source 112, the blowers 113, 115, and so forth constitute treatment gas-supply means; the blowers 113, 115, and so forth constitute treatment gas-oxygen concentration-adjustment means, the heater 114 and so forth constitute treatment gas-temperature-adjustment means; and the blower 122, the heater 123, and so forth constitute test gas-supply means.

Next, description will be given of the operations of the coal inactivation system 100 described above.

When pyrolyzed coal 1 is supplied to the inside of the treatment apparatus body 111 and the control board 131 receives operation-starting information, the controller 130 controls the blowers 113, 115 and the heater 114 in such a manner that the inside of the treatment apparatus body 111 is supplied with the treatment gas 103 having an oxygen concentration Oc of a standard value Os (for example, 10%) and a temperature Tc of a standard value Is (for example, 150° C.) on the basis of the information from the control board 131 (S1 in FIG. 2), and also controls the blower 122 and the heater 123 in such a manner that the inside of the evaluation apparatus body 121 is supplied with the air 102 (oxygen concentration: approximately 20%) having an evaluation temperature Tt (for example, 150° C.) (S2 in FIG. 2).

The surface of the pyrolyzed coal 1 supplied to the inside of the treatment apparatus body 111 is partially oxidized with the treatment gas 103, and the activity is decreased. Thus, the reformed coal 2 is formed. The reformed coal 2 having been subjected to such an inactivation treatment for a predetermined period (for example, 20 minutes) is discharged from the lower portion of the treatment apparatus body 111, and is collected into the vessel. In this event, the controller 130 controls the fractionation device 117 based on the treatment period and so forth in such a manner that only a small portion of the reformed coal 2 discharged from the treatment apparatus body 111 is fractionated as the sample 3 for each predetermined period or continuously and is supplied to the evaluation apparatus body 121 for each predetermined period or continuously (S3 in FIG. 2).

The sample 3 supplied to the evaluation apparatus body 121 is heated by the air 102 for a given period (for example, 10 minutes). The temperature and the carbon dioxide concentration of the air 102 heated by the sample 3 are measured by the sensors 125, 126 (S4 in FIG. 2).

Based on the information from the temperature sensor 125, the controller 130 judges whether a temperature Te of the air 102 is equal to or lower than a lower limit value Tel (for example, 150° C.) (Te≤Tel), equal to or higher than a higher limit value Teh (for example, 200° C.) (Teh≤Te), or higher than the lower limit value Tel but lower than the higher limit value Teh (Tel<Te<Teh) (S5 in FIG. 2).

Figure 2:
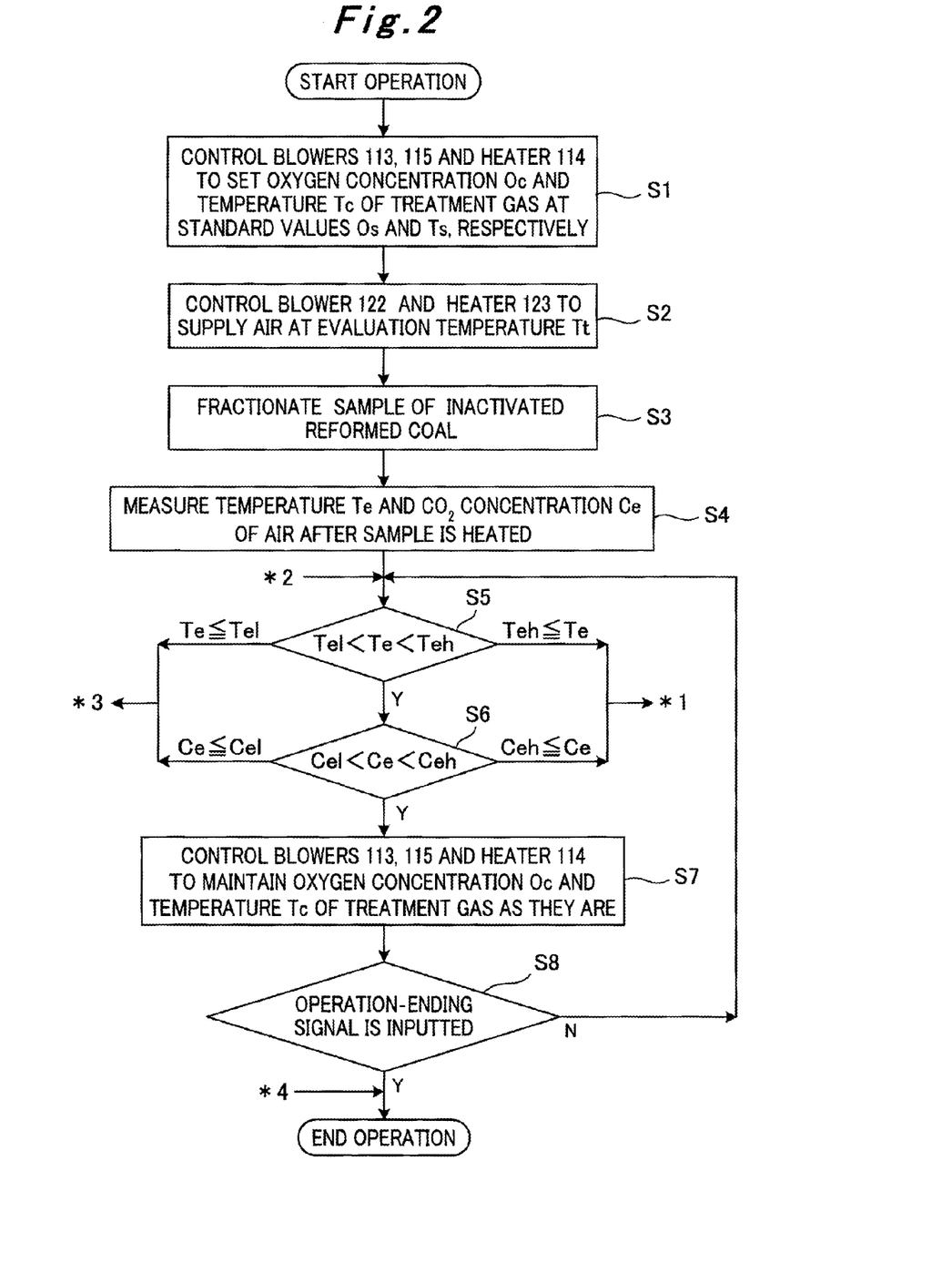
FIG. 2 is a control flowchart of the coal inactivation system in FIG. 1.

If the temperature Te (for example, 160° C.) is higher than the lower limit value Tel but lower than the higher limit value Teh (Tel<Te<Teh), the controller 130 successively judges whether a carbon dioxide concentration Ce in the air 102 is equal to or lower than a lower limit value Cel (for example, 0.1%) (Ce≤Cel), equal to or higher than a higher limit value Ceh (for example, 2%) (Ceh≤Ce), or higher than the lower limit value Cel but lower than the higher limit value Ceh (Cel<Ce<Ceh) based on the information from the $CO_2$ sensor 126 (S6 in FIG. 2).

Then, if the carbon dioxide concentration Ce (for example, 1%) is higher than the lower limit value Cel but lower than the higher limit value Ceh(Cel <Ce <Ceh), the controller 130 determines that the fractionated sample 3 is not burnt with the air 102 having the evaluation temperature Tt, in other words, the reformed coal 2 is sufficiently inactivated in the treatment apparatus body 111 under the above conditions. The controller 130 controls the blowers 113, 115 and the heater 114 in such a manner as to maintain the oxygen concentration Oc and the temperature Tc of the treatment gas 103 as they are (S7 in FIG. 2), and checks whether or not an operation-ending signal is inputted (S8 in FIG. 2). Then, the processing is returned to step S5 above, and the temperature Te of the air 102 is measured again for a sample 3 newly supplied to the evaluation apparatus body 121 by the fractionation device 117.

Figure 3:
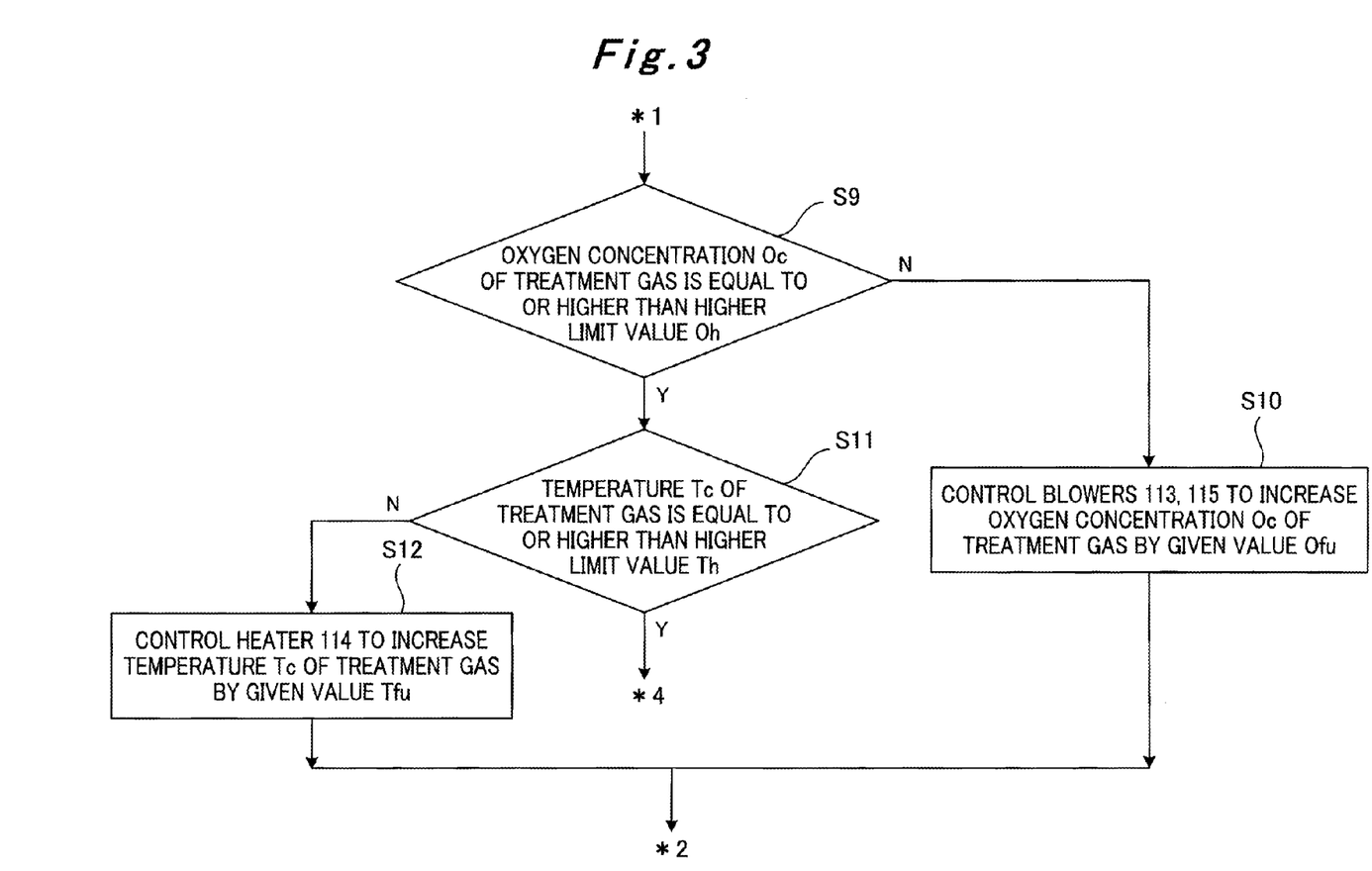
FIG. 3 is a control flowchart continued to FIG. 2.

Meanwhile, in step S5 above, if the temperature Te (for example, 200° C.) is equal to or higher than the higher limit value Teh (Teh≤Te), the controller 130 determines that the sample 3 is with burnt with the air 102 having the evaluation temperature Tt, and judges whether or not the oxygen concentration Oc (for example, 10%) of the treatment gas 103 is equal to or higher than a higher limit value Oh (for example, 16%) (Oh≤Oc) (S9 in FIG. 3). If the oxygen concentration Oc is lower than the higher limit value Oh (Oc<Oh), the controller 130 controls the blowers 113, 115 in such a manner as to increase the oxygen concentration Oc of the treatment gas 103 by a given value Ofu (for example, 2%) (S10 in FIG. 3).

Then, the processing is returned to step S5 above, and the temperature Te of the air 102 is measured again for a sample 3 which is inactivated in the treatment apparatus body 111 under the above conditions, and which is newly supplied to the evaluation apparatus body 121 by the fractionation device 117.

Meanwhile, in step S9 above, if the oxygen concentration Oc (for example, 16%) is equal to or higher than the higher limit value Oh (for example, 16%) (Oh≤Oc), the controller 130 judges whether or not the temperature Tc (for example, 150° C.) of the treatment gas 103 is equal to or higher than a higher limit value Th (for example, 170° C.) (Th≤Tc) (S11 in FIG. 3). If the temperature Tc is lower than the higher limit value Th (Tc<Th), the controller 130 controls the heater 114 in such a manner as to increase the temperature Tc of the treatment gas 103 by a given value Tfu (for example, 10° C.) (S12 in FIG. 3).

Then, the processing is returned to step S5 above, and the temperature Te of the air 102 is measured again for a sample 3 which is inactivated in the treatment apparatus body 111 under the above conditions, and which is newly supplied to the evaluation apparatus body 121 by the fractionation device 117.

Note that, in step S6 above, if the carbon dioxide concentration Ce (for example, 2%) is equal to or higher than the higher limit value Ceh (for example, 2%) (Ceh Ce), the controller 130 determines that the fractionated sample 3 is also burnt with the air 102 having the evaluation temperature Tt.

Then, the processing is moved to step S9 above, and steps S10 to S12 above as well as step S9 are executed.

On the other hand, in step S5 above, if the temperature Te (for example, 150° C.) is equal to or lower than the lower limit value Tel (Te≤Tel), the controller 130 determines that the reformed coal 2 is inactivated excessively with the treatment gas 103, and judges whether or not the temperature Tc (for example, 170° C.) of the treatment gas 103 is equal to or lower than a lower limit value Tl (for example, 150° C.) (Tc≤Tl) (S13 in FIG. 4). If the temperature Tc is higher than the lower limit value Tl (Tl<Tc), the controller 130 controls the heater 114 in such a manner as to decrease the temperature Tc of the treatment gas 103 by a given value Tfd (for example, 10° C.) (S14 in FIG. 4).

Then, the processing is returned to step S5 above, and the temperature Te of the air 102 is measured again for a sample 3 which is inactivated in the treatment apparatus body 111 under the above conditions, and which is newly supplied to the evaluation apparatus body 121 by the fractionation device 117.

Meanwhile, in step S13 above, if the temperature Tc (for example, 150° C.) is equal to or lower than the lower limit value Tl (for example, 150° C.) (Tc≤Tl), the controller 130 judges whether or not the oxygen concentration Oc of the treatment gas 103 (for example, 10%) is equal to or lower than a lower limit value Ol (for example, 6%) (Oc≤Ol) (S15 in FIG. 4). If the oxygen concentration Oc is higher than the lower limit value Ol (Ol<Oc), the controller 130 controls the blowers 113, 115 in such a manner as to decrease the oxygen concentration Oc of the treatment gas 103 by a given value Ofd (for example, 2%) (S16 in FIG. 4).

Then, the processing is returned to step S5 above, and the temperature Te of the air 102 is measured again for a sample 3 which is inactivated in the treatment apparatus body 111 under the above conditions, and which is newly supplied to the evaluation apparatus body 121 by the fractionation device 117.

Figure 4:
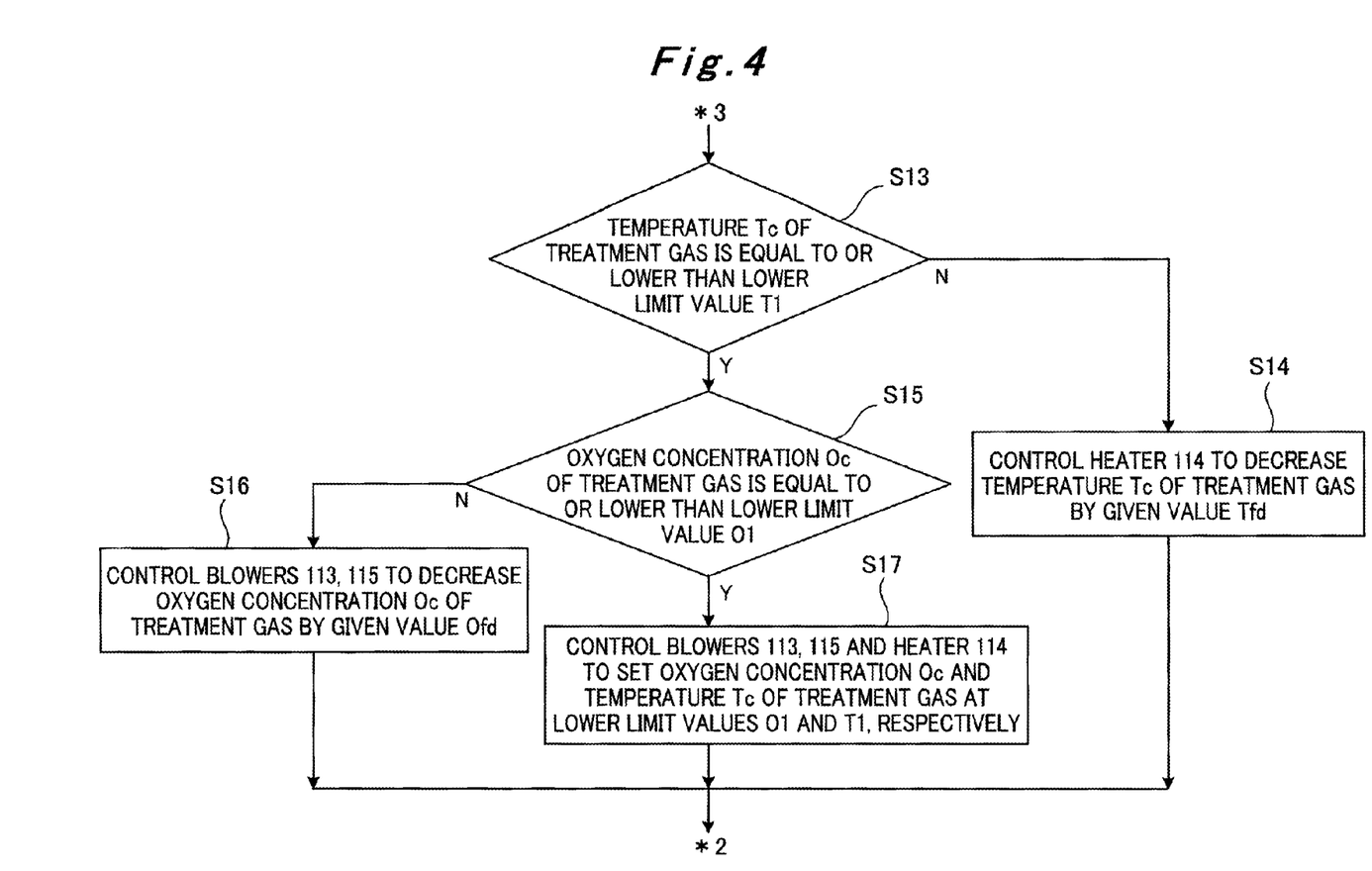
FIG. 4 is a control flowchart continued to FIG. 2.

Meanwhile, in step S15 above, if the oxygen concentration Oc of the treatment gas 103 (for example, 6%) is equal to or lower than the lower limit value Ol (for example, 6%) (Oc≤Ol), the controller 130 controls the blowers 113, 115 and the heater 114 in such a manner as to set the oxygen concentration Oc and the temperature Tc of the treatment gas 103 at the lower limit values Ol and Tl, respectively (S17 in FIG. 4).

Then, the processing is returned to step S5 above, and the temperature Te of the air 102 is measured again for a sample 3 which is inactivated in the treatment apparatus body 111 under the above conditions, and which is newly supplied to the evaluation apparatus body 121 by the fractionation device 117.

Note that, in step S6 above, if the carbon dioxide concentration Ce (for example, 0.1%) is equal to or lower than the lower limit value Cel (for example, 0.1%) (Ce≤Cel), the controller 130 determines that the reformed coal 2 is also inactivated excessively with the treatment gas 103. Then, the processing is moved to step S13 above, and steps S14 to S17 above as well as step S13 are executed.

Hence, even when the composition of the pyrolyzed coal 1 supplied to the treatment apparatus body 111 varies from time to time, the coal inactivation system 100 according to the present embodiment is capable of readily inactivating pyrolyzed coal 1 of such compositions under necessary and sufficient conditions.

Thus, the coal inactivation system 100 according to the present embodiment is capable of inactivating pyrolyzed coals 1 of various compositions at low cost.

Incidentally, in the present embodiment, the result of evaluating, by the evaluation apparatus 120, the sample 3 fractionated as a portion of the reformed coal 2 inactivated in the treatment apparatus body 111 is reflected in inactivation conditions for pyrolyzed coal 1 newly supplied to the treatment apparatus body 111. Accordingly, the reformed coal 2 inactivated insufficiently may be formed in some cases.

Nevertheless, the amount of the reformed coal 2 formed by insufficient inactivation in such an event is quite small in comparison with the amount of the reformed coal sufficiently inactivated under almost the same treatment conditions, that is, the amount of treated low grade coal extracted from the same mining site. Accordingly, the amount is hardly problematic. In this respect, for example, the above reformed coal 2 inactivated insufficiently is supplied once more to and inactivated again in the treatment apparatus body 111 whose inactivation conditions are re-set to reflect the evaluation result by the evaluation apparatus 120, so that sufficiently-inactivated reformed coal 2 can be formed.

<Other Embodiments>

Note that, in the above-described embodiment, the evaluation apparatus 120 is provided with the temperature sensor 125 and the $CO_2$ sensor 126, and the controller 130 makes judgments again on the oxygen concentration Oc and the temperature Tc of the treatment gas 103, according to the carbon dioxide concentration Ce in the air 102 on the basis of the information from the $CO_2$ sensor 126 (step S6 above), when the temperature Te of the air 102 is higher than the lower limit value Tel but lower than the higher limit value Teh based on the information from the temperature sensor 125. Nevertheless, as another embodiment, for example, the $CO_2$ sensor 126 is omitted, and when the temperature Te of the air 102 is higher than the lower limit value Tel but lower than the higher limit value Teh based on the information from the temperature sensor 125, the blowers 113, 115 and the heater 114 are controlled in such a manner as to maintain the oxygen concentration Oc and the temperature Tc of the treatment gas 103 as they are, regardless of the carbon dioxide concentration Ce in the air 102. To put it differently, step S6 above may be omitted.

Moreover, in the above-described embodiment, the description has been given for the case where the controller performs control in such a manner that a portion of the reformed coal 2 discharged from the treatment apparatus body 111 is fractionated as the sample 3 by the movable fractionation device 117 for each predetermined period or continuously and is supplied to the evaluation apparatus body 121 for each predetermined period or continuously. Nevertheless, as another embodiment, for example, a portion of the reformed coal 2 discharged from the treatment apparatus body 111 may be fractionated as the sample 3 by a stationary type (fixed type) of fractionation means such as a fixed gate or a fixed scraper without being controlled by the control means and supplied to the evaluation apparatus body 121.

Further, in the above-described embodiment, the treatment gas 103 having a desired oxygen concentration Oc is generated by mixing the nitrogen gas 101 with the air 102. Nevertheless, as another embodiment, for example, by mixing the nitrogen gas 101 with an oxygen gas, the treatment gas 103 having a desired oxygen concentration may be generated. Nonetheless, as in the above-described embodiment, it is particularly preferable to generate the treatment gas 103 having a desired oxygen concentration by mixing the nitrogen gas 101 with the air 102 because this eliminates the need to prepare the oxygen gas only for the purpose.

Furthermore, it is needless to say that the nitrogen gas cylinder and so forth prepared just to generate the treatment gas 103 are usable as the nitrogen gas supply source 112; besides, it is also possible, for example, to use a pyrolysis gas (main component: nitrogen gas) which is a nitrogen gas supplied to a pyrolyzer to pyrolyze low grade coal and discharged from the pyrolyzer, and from which a volatile component, dust, and the like are separated thereafter. In this case, thermal energy newly applied to the treatment gas 103 can be saved for an inactivation treatment.

Furthermore, in the above-described embodiment, the air 102 is utilized as the test gas. Nevertheless, as another embodiment, it is possible, for example, to utilize a test gas having an oxygen concentration Oc higher than the higher limit value Oh (for example, 16%) by mixing the nitrogen gas 101 with the air 102 as in the case of the treatment gas 103. As the nitrogen gas source in this case, the above-described pyrolysis gas is also usable in addition to, although needlessly to say, a nitrogen gas from the nitrogen gas cylinder, as in the case of the treatment gas 103.

Furthermore, in the above-described embodiment, the description has been given of the case where the pyrolyzed coal 1 is inactivated. Nevertheless, the present invention is not limited thereto, and is applicable to any inactivation treatment on coals as in the case of the above-described embodiment.

INDUSTRIAL APPLICABILITY

Even when the composition of coal supplied to the treatment apparatus body varies from time to time, the coal inactivation system according to the present invention is capable of readily inactivating coals of such compositions under necessary and sufficient conditions. Therefore, the present invention is applicable to the industry very usefully.

REFERENCE SIGNS LIST

1 PYROLYZED COAL
2 REFORMED COAL
3 SAMPLE
100 COAL INACTIVATION SYSTEM
101 NITROGEN GAS
102 AIR
103 TREATMENT GAS
111 TREATMENT APPARATUS BODY
112 NITROGEN GAS SUPPLY SOURCE
113 BLOWER
114 HEATER
115 BLOWER
116 FILTER
117 FRACTIONATION DEVICE
120 EVALUATION APPARATUS
121 EVALUATION APPARATUS BODY
122 BLOWER
123 HEATER
124 FILTER
125 TEMPERATURE SENSOR
126 $CO_2$ SENSOR
130 CONTROLLER
131 CONTROL BOARD

The invention claimed is:

1. A coal inactivation system configured to inactivate coal by heating the coal with a treatment gas containing oxygen, the coal inactivation system comprising:
    a treatment apparatus body, to inside of which the coal is supplied;
    treatment gas-supply means configured to supply the treatment gas to the inside of the treatment apparatus body;
    treatment gas-oxygen concentration-adjustment means configured to adjust an oxygen concentration Oc in the treatment gas;
    treatment gas-temperature-adjustment means configured to adjust a temperature Tc of the treatment gas;
    fractionation means configured to fractionate a portion of the coal inactivated in the treatment apparatus body;
    an evaluation apparatus body, to inside of which a sample of the coal fractionated by the fractionation means is supplied;
    test gas-supply means configured to supply a test gas having an evaluation temperature Tt to the inside of the evaluation apparatus body;
    test gas-temperature-detection means configured to detect a temperature Te of the test gas having heated the sample in the evaluation apparatus body; and
    control means configured to, based on information from the test gas-temperature-detection means,
        when the temperature Te of the test gas is equal to or higher than a higher limit value Teh, judge whether or not the oxygen concentration Oc of the treatment gas is equal to or higher than a higher limit value Oh,
            if the oxygen concentration Oc of the treatment gas is lower than the higher limit value Oh, control the treatment gas-oxygen concentration-adjustment means in such a manner as to increase the oxygen concentration Oc of the treatment gas by a given value Ofu, and
            if the oxygen concentration Oc of the treatment gas is equal to or higher than the higher limit value Oh, further judge whether or not the temperature Tc of the treatment gas is equal to or higher than a higher limit value Th, and control the treatment gas-temperature-adjustment means in such a manner as to increase the temperature Tc of the treatment gas by a given value Tfu if the temperature Tc of the treatment gas is lower than the higher limit value Th, and
        when the temperature Te of the test gas is equal to or lower than a lower limit value Tel, judge whether or not the temperature Tc of the treatment gas is equal to or lower than a lower limit value Tl,
            if the temperature Tc of the treatment gas is higher than the lower limit value Tl, control the treatment gas-temperature-adjustment means in such a manner as to decrease the temperature Tc of the treatment gas by a given value Tfd,
            if the temperature Tc of the treatment gas is equal to or lower than the lower limit value Tl, further judge whether or not the oxygen concentration Oc of the treatment gas is equal to or lower than a lower limit value Ol, and control the treatment gas-oxygen concentration-adjustment means in such a manner as to decrease the oxygen concentration Oc of the treatment gas by a given value Ofd if the oxygen concentration Oc of the treatment gas is higher than the lower limit value Ol.

2. The coal inactivation system according to claim 1, wherein,
    when the temperature Te of the test gas is equal to or lower than the lower limit value Tel, the control means controls the treatment gas-oxygen concentration-adjustment means and the treatment gas-temperature-adjustment means in such a manner as to set the oxygen concentration Oc and the temperature Tc of the treatment gas at the lower limit values Ol and Tl, respectively, if the temperature Tc of the treatment gas is equal to or lower than the lower limit value Tl while the oxygen concentration Oc of the treatment gas is equal to or lower than the lower limit value Ol.

3. The coal inactivation system according to claim 1, wherein,
when the temperature Te of the test gas is higher than the lower limit value Tel but lower than the higher limit value Teh, the control means controls the treatment gas-oxygen concentration-adjustment means and the treatment gas-temperature-adjustment means in such a manner as to maintain the oxygen concentration Oc and the temperature Tc of the treatment gas as they are.

4. The coal inactivation system according to claim 1, further comprising test gas-carbon dioxide concentration-detection means configured to detect a carbon dioxide concentration Ce of the test gas having heated the sample in the evaluation apparatus body, wherein
when the temperature Te of the test gas is higher than the lower limit value Tel but lower than the higher limit value Teh, the control means, based on information from the test gas-carbon dioxide concentration-detection means,
if the carbon dioxide concentration Ce in the test gas is equal to or higher than a higher limit value Ceh, judges again whether or not the oxygen concentration Oc of the treatment gas is equal to or higher than the higher limit value Oh, and
if the carbon dioxide concentration Ce in the test gas is equal to or lower than a lower limit value Cel, judges again whether or not the temperature Tc of the treatment gas is equal to or lower than the lower limit value Tl.

5. The coal inactivation system according to claim 4, wherein,
when the temperature Te of the test gas is higher than the lower limit value Tel but lower than the higher limit value Teh, the control means controls the treatment gas-oxygen concentration-adjustment means and the treatment gas-temperature-adjustment means in such a manner as to maintain the oxygen concentration Oc and the temperature Tc of the treatment gas as they are if the carbon dioxide concentration Ce in the test gas is higher than the lower limit value Cel but lower than the higher limit value Ceh based on the information from the test gas-carbon dioxide concentration-detection means.

\* \* \* \* \*